United States Patent [19]

Mikami

[11] 4,444,283
[45] Apr. 24, 1984

[54] COLLECTING CHUTE FOR A COMBINATORIAL WEIGHING APPARATUS

[75] Inventor: Yoshiharu Mikami, Kyoto, Japan

[73] Assignee: Kabushiki Kaisha Ishida Koki Seisakusho, Kyoto, Japan

[21] Appl. No.: 415,796

[22] Filed: Sep. 8, 1982

[30] Foreign Application Priority Data

Sep. 9, 1981 [JP] Japan .......................... 56-134715[U]

[51] Int. Cl.³ ............................................ G01G 13/16
[52] U.S. Cl. ....................................... 177/59; 177/128
[58] Field of Search ....................... 177/58, 54, 25, 59, 177/105–114, 145, 128; 222/460, 564; 193/2 A, 2 R, 14, 25 E; 141/331, 391, 365

[56] References Cited

U.S. PATENT DOCUMENTS 4,398,612  8/1983  Mikami et al. ...................... 177/58

Primary Examiner—E. A. Goldberg
Assistant Examiner—Patrick W. Foster

[57] ABSTRACT

Disclosed is a collecting chute into which articles weighed by a plurality of weighing machines are discharged for delivery to a subsequent processing step. The collecting chute comprises an upper chute including a plurality of discrete chute members corresponding to the plurality of weighing machines, and a lower chute disposed below and engaging with the upper chute. A bracket which can be freely attached to and detached from a frame is affixed to each discrete chute member at the central portion thereof, and each chute member is provided at its lower end with a pin for engaging a hole formed in the upper edge of the lower chute.

3 Claims, 4 Drawing Figures

COLLECTING CHUTE FOR A COMBINATORIAL WEIGHING APPARATUS

BACKGROUND OF THE INVENTION

This invention relates to a collecting chute and, more particularly, to a collecting chute well-suited for use in a so-called combination computing-type automatic weighing apparatus or counting apparatus, wherein the collecting chute, disposed below a plurality of weighing machines arranged in a circular or other pattern, is adapted to collect weighed or counted articles from the weighing machines and then discharge the articles.

The conventional collecting chute of the above type used in a combination computing automatic weighing apparatus comprises a funnel-shaped unitary structure. In the course of a continuous weighing operation, highly viscous or "sticky" articles often attach themselves to the walls of the chute and must be cleaned off periodically. With the chute of the aforementioned construction, however, the cleaning operation cannot be performed efficiently because the chute must be cleaned while in place. Since such in-situ cleaning is difficult to perform, moreover, thorough cleaning of the chute cannot be carried out with facility. Though detaching the chute is possible, this is another operation which would entail considerable difficulty.

SUMMARY OF THE INVENTION

Accordingly, an object of the present invention is to provide an easy-to-clean collecting chute divided into upper and lower portions, the upper portion comprising a plurality of discrete chute members for guiding articles released by the respective weighing hoppers of a weighing apparatus.

Another object of the present invention is to provide an easy-to-clean collecting chute in which discrete chute members constituting the collecting chute can be readily attached to and detached from a frame.

Other features and advantages of the invention will be apparent from the following description taken in connection with the accompanying drawings, in which like reference characters designate the same or similar parts throughout the figures thereof.

DESCRIPTION OF THE PREFERRED EMBODIMENT

Figure 1:
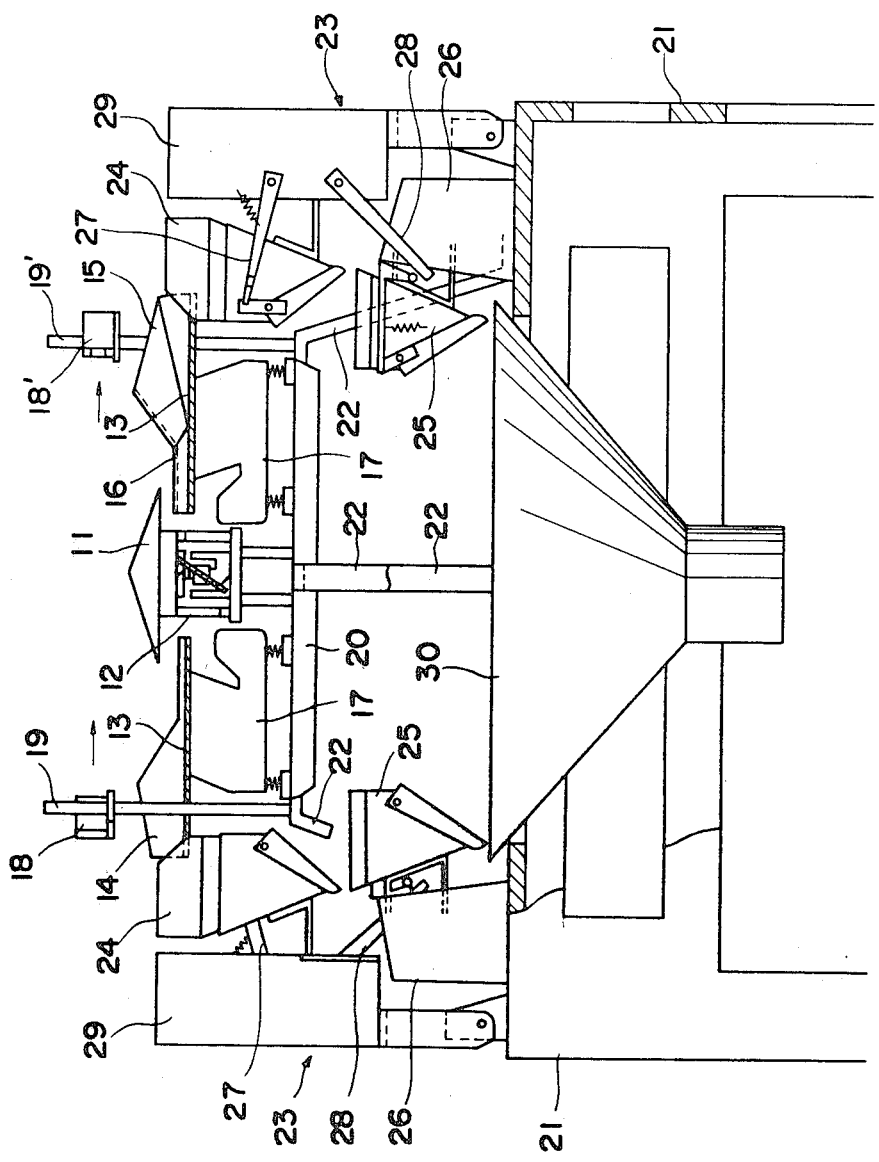
FIG. 1 is a side elevational view of a combination computing-type automatic weighing apparatus having a collecting chute according to the prior art.
Figure 2:
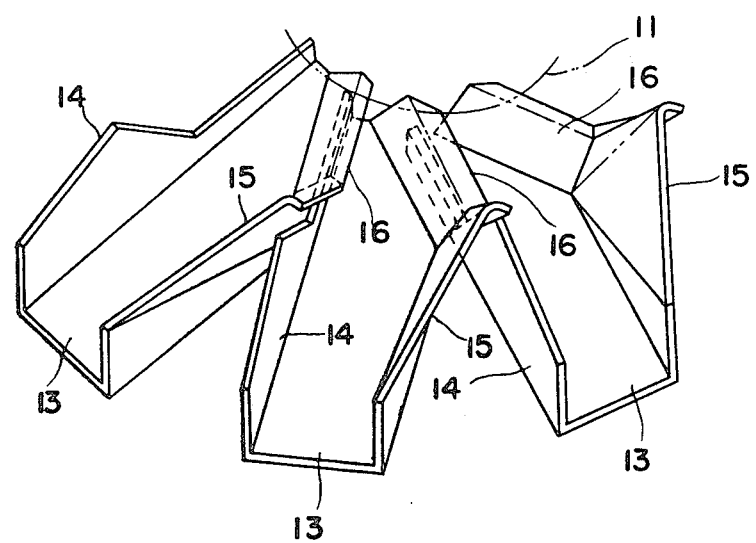
FIG. 2 is a perspective view of supply troughs.

FIG. 1 is illustrative of a combination computing-type automatic weighing apparatus having a conventional chute. The apparatus includes a conically shaped distribution table 11 supported on an electromagnetic vibrating unit 12 for helical reciprocable vibratory motion. The distribution table may otherwise be rotated in one direction by a drive means such as an electric motor rather than the unit 12. A plurality of radial supply troughs 13, illustrated in FIG. 2, are disposed around the distribution table 11, each supply trough having a radially inward end positioned below and adjacent to an outer peripheral edge of the distribution table 11. Each supply trough 13 has a radial passage defined by an angularly edged vertical wall 14 and another wall composed of an angularly edged and outwardly inclined wall portion 15 which extends two-thirds of the wall and an outwardly inclined wall portion 16 which extends one-third of the wall along the vertical wall 14 of an adjacent supply trough. The inclined wall portions 15, 16 have portions extending in an overhanging relation to, but spaced from, the vertical wall of the adjacent supply trough 13. The supply troughs 13 are supported respectively on electromagnetic vibrating units 17. The electromagnetic vibrating units 12, 17 are mounted on a support table 20 fixed to a plurality of support legs 22 secured to a frame 21. The support table 20 supports thereon a pair of posts 19, 19' which are disposed symmetrically with respect to the distribution table 11 and which support a light source 18 and a photodetector 18', respectively.

There are mounted on the frame 21 a plurality of weighing machines 23 each comprising a pool hopper 24 for receiving articles to be weighed from the supply trough 13, a weighing hopper 25 for receiving the articles from the pool hopper 24, a weighing mechanism 26 for weighing the articles in the weighing hopper 25, and a drive unit 29 for opening and closing the pool hopper 24 and the weighing hopper 25 with lever mechanisms 27, 28. The supply trough 13 has a distal end projecting into the pool hopper 24 of the weighing machine 23 so that the articles from the supply trough 13 will be introduced into the pool hopper 24. A funnel-shaped chute 30 is supported on the frame 21 and has a flaring opening projecting slightly above an upper surface of the frame 21 for collecting the articles discharged from the weighing hoppers 25 of the weighing machines 23 and discharging the articles onto a bucket conveyor or into a packaging machine, not shown.

When the articles to be weighed are supplied onto the distribution table 11, the articles are distributed into the supply troughs 13 due to vibratory motion of the electromagnetic vibrating unit 17 to supply the articles from the supply troughs 13 into the pool hoppers 24 and then into the weighing hoppers 25 in which the articles are weighed. The articles which have been weighed are discharged down into the chute 30 onto the bucket conveyor or a packaging machine, not shown. The objects to be weighed are supplied onto the distribution table 11 by a supply conveyor (not shown) which is controlled by a light signal transmitted from the light source 18 to the photodetector 18' so that the distribution table 11 is always supplied with a constant number of the articles to be weighed.

Figure 3:
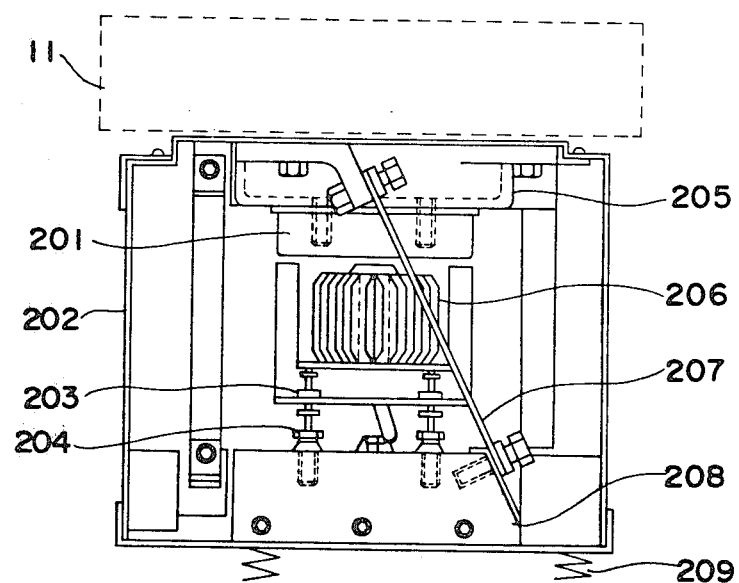
FIG. 3 is a side elevational view of an electromagnetic vibrating unit.

FIG. 3 illustrates the electromagnetic vibrating unit 12, which includes an electromagnet 206 attached to and supported on a pedestal 208 by means of fixing bolts 204 and adjustable by adjustment nuts 203 threadedly engaged with the corresponding bolts 204. A moving core 201, supported by a leaf spring 207, is disposed above and confronting the electromagnet 206, and is further attached to a fixing plate 205 on which the distribution table 11 is firmly secured. The vibrator assembly is enclosed within an electromagnetic cover 202 supported on vibration preventing springs 209.

In operation, the electromagnet 206 is supplied with an electric current intermittently, whereby the electromagnet vibrates the moving core 201 by attracting the moving core 201 against the action of the leaf spring 207 whenever the current flows, and allowing the leaf spring 207 to return the moving core 201 whenever the current flow is interrupted. Because of the angle at which the leaf spring 207 is attached in FIG. 3, the vibratory motion of the moving core 201 is composed of both vertical and rotational components, so that the distribution table is vibrated in a helically reciprocating manner by the moving core through the plate 205. As a result, the articles carried on the distribution table 11 and vibrated thereby are caused to move in a radial manner.

Figure 4:
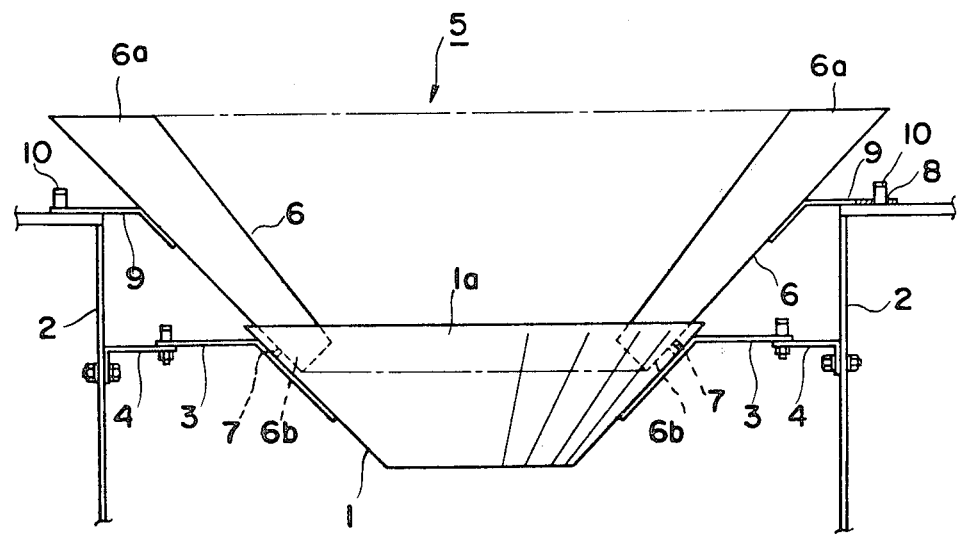
FIG. 4 is a side elevational view of a collecting chute according to the present invention.

A collecting chute in accordance with the present invention is illustrated in FIG. 4. The collecting chute includes a frusto-conical lower chute 1 supported on a frame 2 by means of joined brackets 3 and 4. Each bracket 3 has a bent portion for abutting against the sloping outer surface of the lower chute 1, the bent portion having the same slope as said outer surface. The lower chute 1 may be affixed at its outer surface to the bent portions of the brackets 3, or may simply be set thereon. In the former case, however, it is preferred that the joined brackets 3 and 4 be readily detachable from each other as in the manner of brackets 9, as will be described below. The collecting chute further includes an upper chute 5 disposed on the lower chute 1. The upper chute 5 has a sloping surface inclined at the same angle as the sloping surface of the lower chute 1, and comprises a plurality of discrete chute members 6 so arranged that the upper end portions thereof receive the articles released from respective ones of the weighing hoppers 25 of the weighing machines. Each chute member 6 has a bracket 9 fixedly secured to the central portion of the sloping outer surface thereof, an upper open end 6a which is large enough to receive the articles released from a weighing hopper 25, and a lower open end 6b which extends into the lower chute 1 for guiding the discharged articles into the lower chute, the chute member 6 growing gradually narrower from its upper to lower end. Each chute member 6 is provided with an engaging pin 7 at the lower end of its sloping surface, the pin 7 mating with a corresponding hole formed in the upper edge 1a of the lower chute 1, to hold the chute member 6 in place. The bracket 9 has a horizontal portion whose free end is provided with an engaging hole 8 for mating with a mounting pin 10 provided on the upper surface of the frame 2, whereby the chute member 6 is mounted on the frame 2.

To assemble the above-described upper chute 5 on a weighing apparatus, the engaging holes 8 in the brackets 9 affixed to respective ones of the chute members 6 are fitted over the corresponding mounting pins 10 provided on the upper surface of the frame 2, and the engaging pins 7 at the lower ends of the chute members 6 are fitted into the corresponding holes provided in the upper circumferential edge 1a the top opening of the lower chute 1. Thus, the frame 2 and lower chute 1 support the upper chute 5 in a secure and stable manner.

The lower chute 1 is mounted on the frame 2 in advance by means of the brackets 3, 4, as described above.

To dissemble and remove the upper chute 5 for cleaning, the pins 7 on the discrete chute members 6 are withdrawn from the holes in the lower chute 1, and the holes 8 in the brackets 9 are slipped off from the mounting pins 10 provided on the frame 2, thereby completely freeing the upper chute 5 so that is may be removed from the frame 2 and lower chute 1 for cleaning or other purpose. The lower chute 1 also can be removed with ease by lifting it off the brackets 3 if it is not secured thereto, or by disconnecting the brackets 3 from the brackets 4 if the brackets 3 are affixed to the lower chute.

In accordance with the present invention as described and illustrated hereinabove, the collecting chute includes the upper chute 5 comprising the plurality of discrete chute members 6, and the lower chute 1, the upper chute 5 being so adapted as to be readily attachable to and detachable from the frame 2 and the lower chute 1. The collecting chute of the invention therefore is very easy to handle and detach, thereby greatly facilitating the removal of viscous articles which have attached themselves to the inner walls of the collecting chute.

Although a certain preferred embodiment has been shown and described in detail, it should be understood that many changes and modifications may be made therein without departing from the scope of the appended claims.

What I claim is:

1. A collecting chute, supported on a frame, for collecting and discharging articles released from the lower ends of a plurality of weighing machines arranged in a circular or other pattern for weighing or counting the articles before release, which collecting chute comprises;

an upper chute, including a plurality of discrete chute members corresponding to respective ones of the plurality of weighing machines, each chute member having a central portion at which the chute member is mounted on said frame, said upper chute having an upper end for receiving the articles and a lower end for discharging the articles, and a lower chute supported on said frame for engaging with and supporting the lower end of said upper chute, and for receiving and discharging the articles discharged from the lower end of said upper chute.

2. A collecting chute according to claim 1, in which each of said discrete chute members has a lower end portion to which a pin is affixed for mating with a hole in said lower chute, and in which a bracket is affixed to the central portion of each discrete chute member for mounting said chute member on said frame.

3. A collecting chute according to claim 2, in which said bracket has an end portion provided with a hole for mating with a mounting pin provided on said frame.

* * * * *

UNITED STATES PATENT AND TRADEMARK OFFICE
CERTIFICATE OF CORRECTION

PATENT NO. : 4,444,283
DATED : April 24, 1984
INVENTOR(S) : Yoshiharu Mikami

It is certified that error appears in the above-identified patent and that said Letters Patent is hereby corrected as shown below:

Front page, after "Assistant Examiner-Patrick W. Foster", insert
--Attorney, Agent, or Firm-Staas & Halsey--.

Column 1, line 23, "in-situ" should be in italics;

line 62, "reciprocable" should be --reciprocal--.

Column 4, line 3, "dissemble" should be --disassemble--;

line 37, ";" should be --:--.

Signed and Sealed this

Sixth Day of November 1984

[SEAL]

Attest:

GERALD J. MOSSINGHOFF

Attesting Officer

Commissioner of Patents and Trademarks